US012361908B2

(12) United States Patent
Yanagawa

(10) Patent No.: US 12,361,908 B2
(45) Date of Patent: Jul. 15, 2025

(54) DISPLAY APPARATUS, SOURCE DRIVER, AND GRADATION VOLTAGE GENERATING CIRCUIT

(71) Applicant: LAPIS Technology Co., Ltd., Yokohama (JP)

(72) Inventor: Kenji Yanagawa, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/609,715

(22) Filed: Mar. 19, 2024

(65) Prior Publication Data

US 2024/0331656 A1 Oct. 3, 2024

(30) Foreign Application Priority Data

Mar. 28, 2023 (JP) ................................ 2023-051313

(51) Int. Cl.
*G09G 3/36* (2006.01)

(52) U.S. Cl.
CPC ....... *G09G 3/3696* (2013.01); *G09G 2310/08* (2013.01); *G09G 2320/0673* (2013.01); *G09G 2330/12* (2013.01)

(58) Field of Classification Search
CPC ............. G09G 3/3696; G09G 2310/08; G09G 2320/0673; G09G 2330/12
See application file for complete search history.

(56) References Cited

U.S. PATENT DOCUMENTS 7,317,442 B2 * 1/2008 Nakai .................. G09G 3/3688 345/87
2020/0286448 A1 * 9/2020 Kim .......................... G09G 5/10
2021/0090519 A1 * 3/2021 Tsuchi ................. G09G 3/3696

FOREIGN PATENT DOCUMENTS

JP 2007286525 A 11/2007

* cited by examiner

*Primary Examiner* — Kwang-Su Yang
(74) *Attorney, Agent, or Firm* — VOLENTINE, WHITT & FRANCOS, PLLC

(57) ABSTRACT

A source driver of the disclosure supplies a display device having a plurality of display cells with gradation voltages corresponding to respective luminance levels for the display cells indicated by a video signal. The source driver includes a gamma voltage generating circuit and a gradation voltage determination circuit. The gamma voltage generating circuit includes a resistor voltage dividing circuit with a plurality of output terminals. The plurality of output terminals output respective reference voltages divided according to gamma curve characteristics for generating the gradation voltages. The gradation voltage determination circuit measures an electric potential difference between one pair among the plurality of output terminals and determines whether or not the electric potential difference corresponds to a reference voltage group based on the gamma curve characteristics.

11 Claims, 12 Drawing Sheets

DISPLAY APPARATUS, SOURCE DRIVER, AND GRADATION VOLTAGE GENERATING CIRCUIT

CROSS-REFERENCE TO RELATED APPLICATION

This application is based upon and claims the benefit of priority from the prior Japanese Patent Application No. 2023-05131 filed on Mar. 28, 2023, the entire contents of which are incorporated herein by reference.

BACKGROUND

1. Technical Field

The disclosure relates to a source driver, a display apparatus, and a gradation voltage generating circuit.

2. Description of the Related Art

In in-vehicle products, requirements for safety, such as functional safety requirements, are increasing, and various fault detection functions have been implemented. Planar display devices, such as liquid crystal panels that use a signal driver such as a source driver, are widely installed in automobiles. For example, when the mirrors of an automobile are composed of liquid crystal panels, a malfunction of a display device affects the lives of occupants of the automobile. Therefore, it is necessary to have high reliability in display apparatus components, such as source drivers. A gradation voltage generating circuit for generating output voltages from source amplifiers of the source driver is one of the important circuits related to image display characteristics.

JP-A-2007-286525 discloses a source driver including a gradation voltage generating circuit in a liquid crystal display apparatus in which display cells are driven by a driver including a plurality of LCD driver ICs.

However, in the source driver disclosed in JP-A-2007-286525, a function to detect a fault or monitor characteristic variations over time is not implemented in the gradation voltage generating circuit for generating the output voltages from source amplifiers. Recently, there has been a demand in the market for such a function to detect a fault or monitor characteristic variations over time in the gradation voltage generating circuit.

The disclosure is made in consideration of the above point, and an example of an object of the disclosure is to provide a source driver, a display apparatus, and a gradation voltage generating circuit having a function of monitoring an output voltage from its own gradation voltage generating circuit and performing fault detection of its own circuit.

SUMMARY

A source driver of the disclosure supplies a display device having a plurality of display cells with gradation voltages corresponding to respective luminance levels for the display cells indicated by a video signal. The source driver includes a gamma voltage generating circuit and a gradation voltage determination circuit. The gamma voltage generating circuit includes a resistor voltage dividing circuit with a plurality of output terminals. The plurality of output terminals output respective reference voltages divided according to gamma curve characteristics for generating the gradation voltages. The gradation voltage determination circuit measures an electric potential difference between one pair among the plurality of output terminals and determines whether or not the electric potential difference corresponds to a reference voltage group based on the gamma curve characteristics.

A display apparatus of the disclosure includes a display device and a source driver. The display device has a plurality of display cells. The source driver supplies gradation voltages corresponding to respective luminance levels for the display cells indicated by a video signal. The source driver includes a gamma voltage generating circuit and a gradation voltage determination circuit. The gamma voltage generating circuit includes a resistor voltage dividing circuit that includes a plurality of output terminals. The plurality of output terminals outputting respective reference voltages divided according to gamma curve characteristics for generating the gradation voltages. The gradation voltage determination circuit measures an electric potential difference between one pair among the plurality of output terminals and determines whether or not the electric potential difference corresponds to a reference voltage group based on the gamma curve characteristics.

A gradation voltage generating circuit of the disclosure generates a plurality of gradation voltages corresponding to respective luminance levels for display cells indicated by a video signal. The gradation voltage generating circuit includes a gamma voltage generating circuit and a gradation voltage determination circuit. The gamma voltage generating circuit includes a resistor voltage dividing circuit that includes a plurality of output terminals. The plurality of output terminals output respective reference voltages divided according to gamma curve characteristics for generating the gradation voltages. The gradation voltage determination circuit measures an electric potential difference between one pair among the plurality of output terminals and determines whether or not the electric potential difference corresponds to a reference voltage group based on the gamma curve characteristics. The gradation voltage determination circuit includes a timing control circuit, a selection circuit, a detection circuit, a signal conversion circuit, and a fault detection circuit. The timing control circuit generates a timing signal to control a measurement of the electric potential difference between the one pair among the plurality of output terminals during a blank period in the video signal. The selection circuit selects the one pair from among the plurality of output terminals of the resistor voltage dividing circuit based on the timing signal. The detection circuit detects the electric potential difference between the selected one pair among the plurality of output terminals. The signal conversion circuit performs A/D conversion of the detected electric potential difference to generate a measured value. The fault detection circuit detects a fault in the gamma voltage generating circuit based on the measured value.

DETAILED DESCRIPTION

Figure 1:
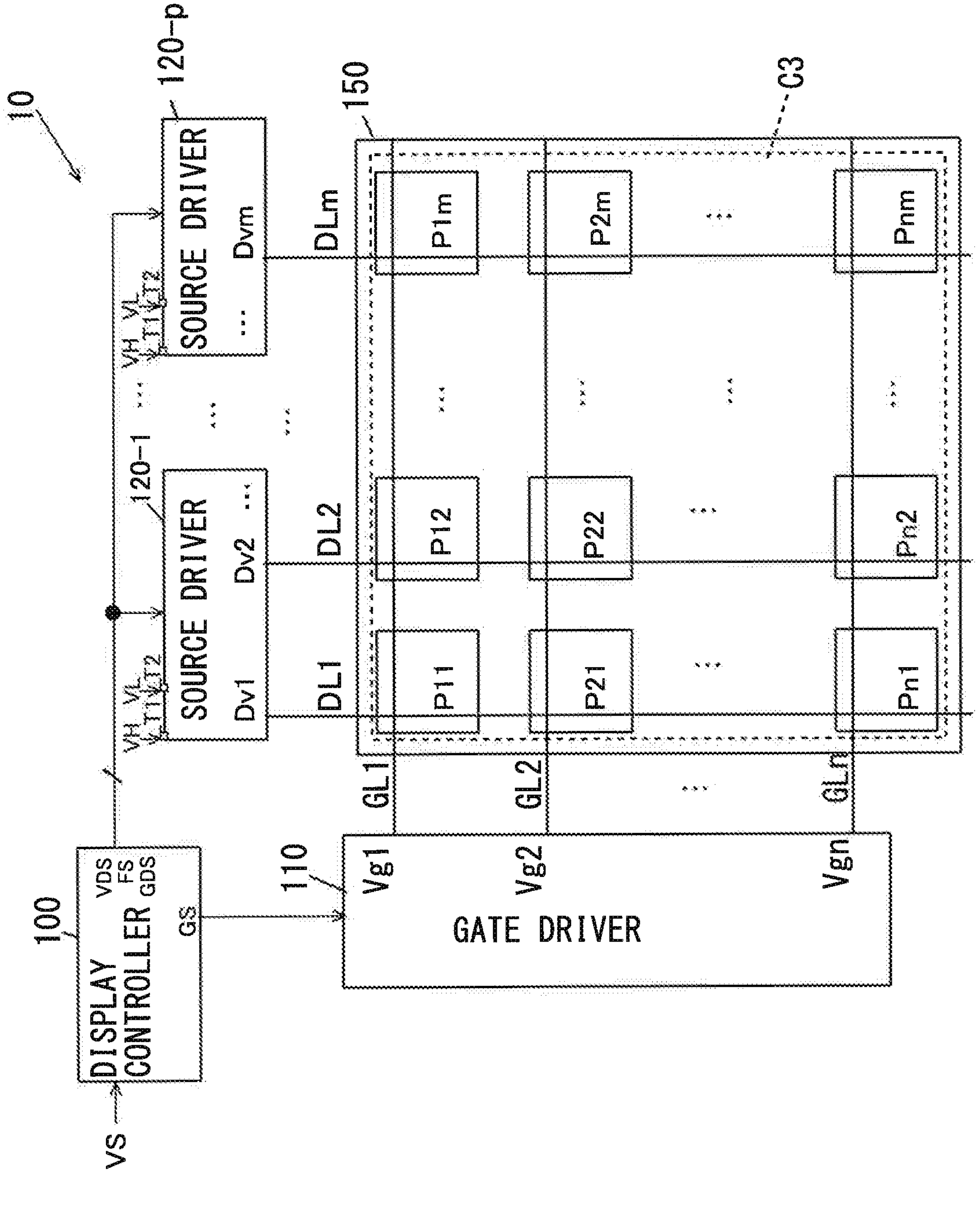
FIG. 1 is a block diagram illustrating a configuration of a display apparatus of a first embodiment of the disclosure.

The disclosure provides an effect of allowing fault detection or monitoring of characteristic variations over time in the gradation voltage generating circuit.

Display apparatuses of embodiments of the disclosure will be described with reference to the drawings below. In the embodiments, identical reference numerals are given to the components having substantially identical function and configuration, and repeated explanation is omitted.

First Embodiment

FIG. 1 is a block diagram illustrating a configuration of a display apparatus 10 of this embodiment. The display apparatus 10 is an active matrix drive liquid crystal display apparatus. The display apparatus 10 includes a display controller 100, a gate driver 110, source drivers 120-1 to 120-*p*, and a display panel 150 (display device). Note that one of the source drivers 120-1 to 120-*p* is also simply referred to as a source driver 120.

The display panel 150 is configured to have a substrate main surface on which gate lines GL1 to GLn (n is an integer of two or more) that extend in a horizontal direction of a two-dimensional screen and source lines DL1 to DLm (m is an integer of two or more) that extend in a perpendicular direction of the two-dimensional screen are arranged to intersect with one another. The respective source drivers 120-1 to 120-*p* are disposed every predetermined number of source lines, and the entire p (p is an integer greater than one) source drivers drive the source lines DL1 to DLm of the display panel 150. The gate driver 110 drives the gate lines GL1 to GLn. Note that one of the gate lines GL1 to GLn is also simply referred to as a gate line GL, and one of the source lines DL1 to DLm is also simply referred to as a source line DL.

In the display panel 150, a plurality of display cells P11 to Pnm are disposed at respective intersecting portions of the gate lines GL1 to GLn and the source lines DL1 to DLm and arranged in a matrix.

Figure 2:
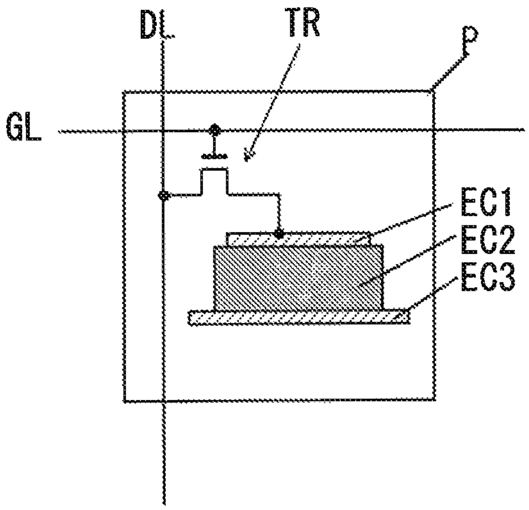
FIG. 2 is a diagram schematically representing a structure of one display cell in a plurality of display cells of a display panel of the display apparatus of the first embodiment.

FIG. 2 is a diagram schematically representing a structure of one display cell P in the plurality of display cells P11 to Pnm of the display panel 150 of the display apparatus 10. The display cell P includes a display cell electrode EC1, a liquid crystal layer EC2, and an opposite substrate electrode EC3 that are laminated on one another, and, for example, a nMOS transistor as a display cell switch TR of an on-off switch. Note that one of the display cells P11 to Pnm, each of which is a part of a pixel, is also representatively referred to as the display cell P. While at least display cells of a red color, a green color, and a blue color are required to constitute one pixel, in FIG. 1 and FIG. 2, only those representative display cells are represented.

The display cell electrode EC1 illustrated in FIG. 2 is a transparent electrode disposed independently for each of the display cells P11 to Pnm. The opposite substrate electrode EC3 is a single transparent electrode across an entire surface of the display panel 150. The display cell switch TR includes a control terminal (gate) connected to the gate line GL and a source terminal connected to the source line DL. Furthermore, the display cell switch TR includes a drain terminal connected to the display cell electrode EC1. An opposite substrate voltage as a common voltage is applied to the opposite substrate electrode EC3. A transmittance of liquid crystal changes according to electric potential difference between a gradation voltage signal for driving (gradation voltage) applied from the source line DL to the display cells P11 to Pnm and the opposite substrate voltage, thereby emitting back light inside the display apparatus from the display cells P11 to Pnm.

The respective display cell switches TR (see FIG. 2) of the plurality of display cells P11 to Pnm illustrated in FIG. 1 are controlled to be on or off according to gate signals Vg1 to Vgn supplied from the gate driver 110.

The display cells P11 to Pnm receives a supply of display cell driving voltages (gradation voltages) corresponding to video data from the source driver 120. Specifically, when driving voltage signals Dv1 to Dvm are output from the source driver 120 to the source lines DL1 to DLm, and each of the display cell switches TR (see FIG. 2) of the display cells P11 to Pnm is on, the driving voltage signals Dv1 to Dvm are applied to the display cells P11 to Pnm. This charges each display cell of the display cells P11 to Pnm and controls a luminance thereof.

The display controller 100 illustrated in FIG. 1 extracts series of video data pieces representing respective luminance levels for the display cells of the red, green, and blue colors, synchronization signals (horizontal, perpendicular), a clock signal, a polarity inversion signal, and a gamma setting signal GDS from a received video signal VS, generates a video data signal VDS as a serial signal including the polarity inversion signal, and supplies the gamma setting signal GDS and the video data signal VDS to the source drivers 120-1 to 120-*p*.

In addition, the display controller 100 generates a frame synchronization signal FS indicating timing of the video data signal VDS (video signal) per frame based on the extracted synchronization signals and supplies the frame synchronization signal FS to the source driver 120.

The display controller 100 generates a gate control signal GS indicating timing of selecting each of the gate lines GL1 to GLn of the display panel 150 according to the extracted synchronization signals and supplies the gate control signal GS to the gate driver 110.

The gate driver 110 receives the supply of the gate control signal GS from the display controller 100 and supplies the gate signals Vg1 to Vgn sequentially to the gate lines GL1 to GLn based on the clock timing included in the gate control signal GS. The supply of the gate signals Vg1 to Vgn selects the display cells P11 to Pnm with respect to each display cell row. Then, the driving voltage signals Dv1 to Dvm are applied to the selected display cells from the source driver 120, thereby writing the gradation voltages (driving voltages) to the display cell electrodes EC1 of the plurality of display cells P11 to Pnm.

Thus, in this embodiment, n display cell data piece groups, each of which is constituted of m (m output channels) display cell data pieces, serially continue, thereby configuring the video data signal VDS for one frame. Each of the n display cell data piece groups is a display cell data piece group constituted of the display cell data pieces corresponding to the gradation voltages whose respective supply targets are the display cells on one horizontal scanning line (that is, each of the gate lines GL1 to GLn). An operation of the source driver 120 applies the driving voltage signals Dv1 to Dvm whose supply targets are n×m display cells (that is, the display cells P11 to Pnm) via the source lines DL1 to DLm based on the m×n display cell data pieces.

An operation of the gate driver 110 selects m display cells arranged along a gate line extension direction (that is, in a lateral row) as the supply targets of the driving voltage signals Dv1 to Dvm. The source driver 120 applies the driving voltage signals Dv1 to Dvm to the selected display cells in a lateral row and causes the display cells to display with the luminances according to the voltages. By repeating the application in a source line extension direction (that is, a longitudinal direction) while selectively switching the display cells in a lateral row to be selected as the supply targets of the driving voltage signals Dv1 to Dvm, a screen display for one frame is performed.

The source driver 120 receives the supply of the video data signal VDS from the display controller 100, generates the multi-value level gradation voltages (driving voltage signals) Dv1 to Dvm according to a gradation count indicated by the video data signal VDS, and applies them to the display cells P11 to Pnm via the source lines DL1 to DLm. Here, in this explanation, the driving voltage signals Dv1 to Dvm are also referred to as gradation voltage signals Dv1 to Dvm. Further, one of the gradation voltage signals Dv1 to Dvm is also simply referred to as a gradation voltage signal Dv.

Each source driver 120 includes terminals T1 and T2 and are respectively supplied with a high first reference voltage VH and a second reference voltage VL having a lower electric potential than the first reference voltage VH via the terminals T1 and T2 from a reference voltage source (not illustrated). The first reference voltage VH and the second reference voltage VL are used for generating the gradation voltages (driving voltage signals) Dv1 to Dvm.

Figure 3:
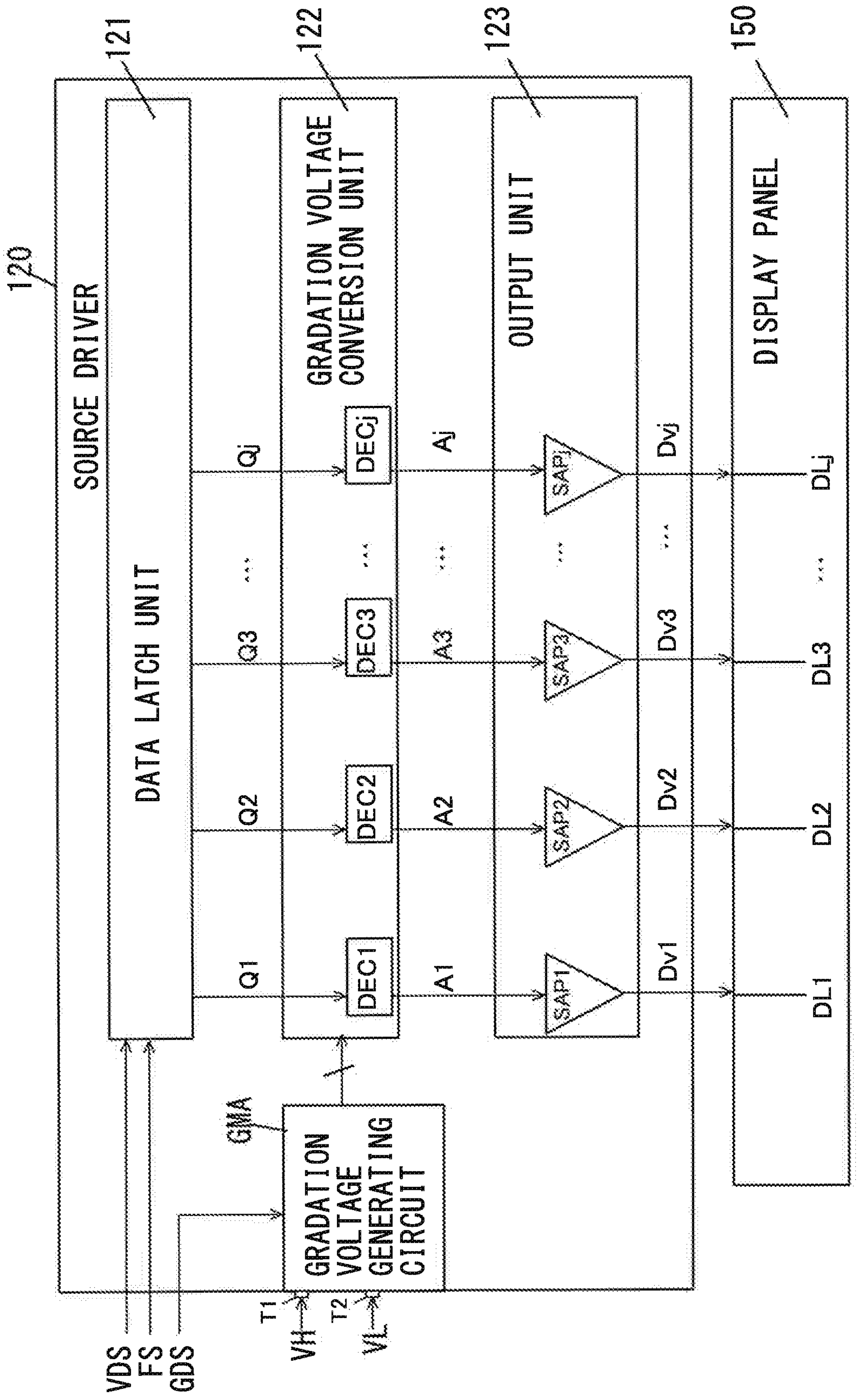
FIG. 3 is a block diagram illustrating a part of a configuration inside a source driver of the display apparatus of the first embodiment.

FIG. 3 is a block diagram illustrating a part of an internal configuration of the source driver 120. The source driver 120 includes a data latch unit 121, a gradation voltage conversion unit 122, an output unit 123, and a gradation voltage generating circuit GMA.

The data latch unit 121 sequentially retrieves series of display cell data pieces included in the video data signal VDS supplied from the display controller 100. Then, in response to the retrieval of the display cell data pieces for j channels ($j<m$, $j \times p=m$), the data latch unit 121 outputs the retrieved display cell data pieces as display cell data Q1 to Qj to the gradation voltage conversion unit 122.

The gradation voltage conversion unit 122 uses reference gradation voltages (described later) to be supplied to convert based on the display cell data Q1 to Qj supplied from the data latch unit 121 to gradation voltages A1 to Aj having voltage values corresponding to luminance gradations represented by the display cell data with decoders DEC1 to DECj and outputs the gradation voltages A1 to Aj to the output unit 123.

The output unit 123 generates the gradation voltage signals Dv1 to Dvj for driving obtained by amplifying the gradation voltages A1 to Aj with driving source amplifiers SAP1 to SAPj corresponding to the gradation voltages A1 to Aj and outputs the gradation voltage signals Dv1 to Dvj to the source lines DL1 to DLj of the display panel 150.

The gradation voltage generating circuit GMA generates reference gradation voltages V1 to VN represented by the luminance levels that can be displayed on the display panel 150, for example, N gradations, as a plurality of gamma voltages (reference gradation voltages) according to the gamma curve characteristics of the display panel 150, which are set values written in a non-volatile memory (not illustrated) based on the gamma setting signal GDS obtained from the display controller 100 and supplies the reference gradation voltages V1 to VN to each of the decoders DEC1 to DECj included in the gradation voltage conversion unit 122.

Figure 4:
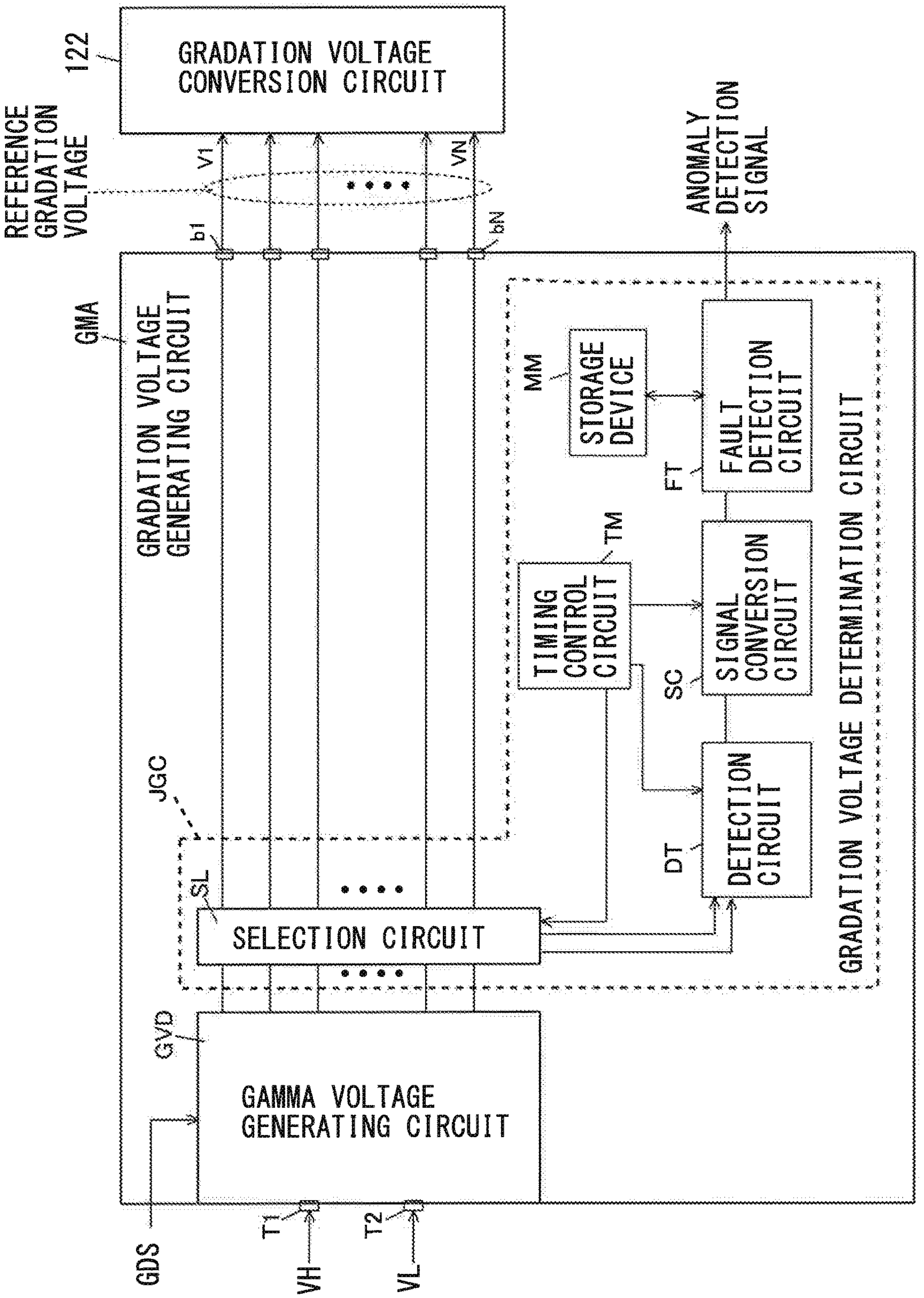
FIG. 4 is a schematic block diagram illustrating an internal configuration of a gradation voltage generating circuit in the source driver of the first embodiment.

FIG. 4 is a schematic block diagram illustrating an internal configuration of the gradation voltage generating circuit GMA in the source driver 120 that supplies a gradation voltage (driving voltage signal) corresponding to a luminance level for each display cell P indicated by a video signal to a source line of the display panel 150.

The gradation voltage generating circuit GMA includes a gamma voltage generating circuit GVD and a gradation voltage determination circuit JGC. The gamma voltage generating circuit GVD includes a resistor voltage dividing circuit (such as a second ladder resistor LD2 illustrated in a second embodiment) having a plurality of output terminals b1 to bN that output respective reference gradation voltages divided according to the gamma curve characteristics for generating the gradation voltages. The gradation voltage determination circuit JGC sequentially measures an electric potential difference between one pair among the output terminals b1 to bN and determines whether or not the electric potential difference corresponds to a reference voltage group (gamma voltage) based on the gamma curve characteristics.

The gradation voltage determination circuit JGC includes a timing control circuit TM, a selection circuit SL, a detection circuit DT, a signal conversion circuit SC, and a fault detection circuit FT. The timing control circuit TM generates a timing signal to control the sequential measurement of the electric potential difference between one pair among the plurality of output terminals b1 to bN (output taps). The selection circuit SL selects the above-described one pair from among the plurality of output terminals b1 to bN based on the timing signal sequentially one pair at a time. The detection circuit DT detects the electric potential difference between the selected one pair among the plurality of output terminals b1 to bN. The signal conversion circuit SC performs amplification and A/D conversion of the detected electric potential difference to generate a measured value. The fault detection circuit FT detects a fault in the gamma voltage generating circuit GVD based on the measured value. The timing control circuit TM controls start-up timing for not only the selection circuit SL but also the detection circuit DT and the signal conversion circuit SC.

The gradation voltage determination circuit JGC also includes a storage device MM, such as a non-volatile memory and a register, that stores expected voltage values of the gamma curve characteristics. In the storage device MM, the set value written based on the gamma setting signal GDS obtained from the display controller 100 can be stored.

Figure 5:
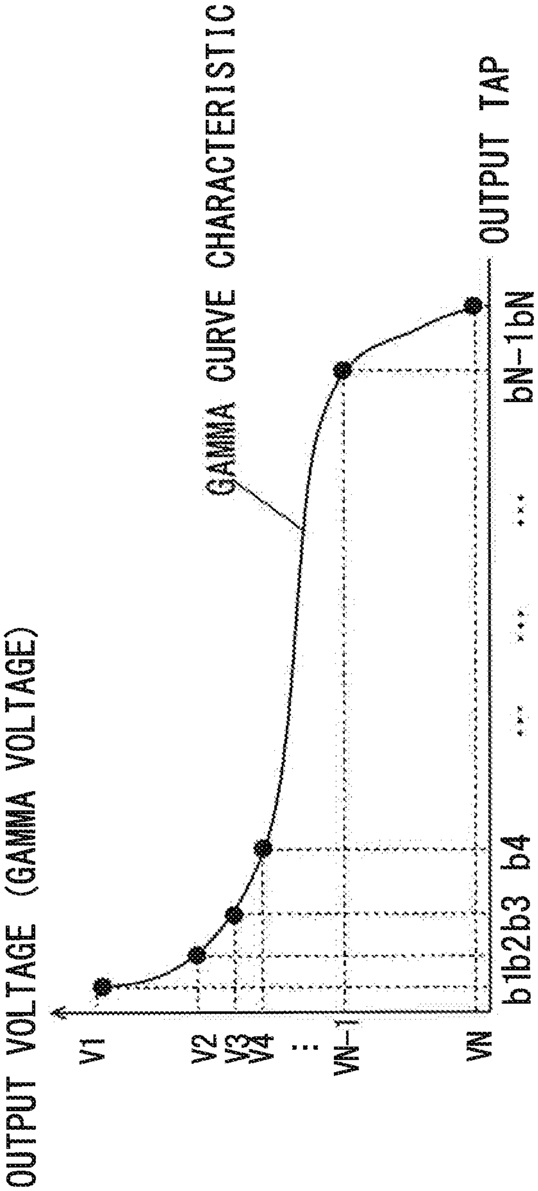
FIG. 5 is a graph illustrating an exemplary relationship between a reference voltage group (gamma voltages) of expected voltage values of gamma curve characteristics used in the gradation voltage generating circuit and a plurality of output taps in the source driver of the first embodiment.

FIG. 5 is a graph illustrating an exemplary relationship between the reference voltage group (gamma voltages) of the expected voltage values of the gamma curve characteristics used in the gradation voltage generating circuit and a plurality of output taps in the source driver of the first embodiment. As illustrated in FIG. 5, gradation data (display data) of an image is represented by the gamma curve characteristics. The gamma curve characteristics are represented as the output voltages (gamma voltages) corresponding to the plurality of output terminals b1 to bN (output taps) of the gradation voltage determination circuit JGC. The voltage values based on the gamma curve characteristics can be stored in the storage device MM as gamma expected voltage value data.

The fault detection circuit FT detects a fault in the gamma voltage generating circuit GVD by comparing the gamma expected voltage value data stored in the storage device MM with the measured value of the signal conversion circuit SC.

Thus, according to this embodiment, one pair of the output terminals b1 to bN of output amplifiers AP to APN of the gamma voltage generating circuit GVD is selected by a switch operation, for example, similarly to the second embodiment, and the electric potential difference is detected by the detection circuit DT. The electric potential difference detected by the detection circuit DT is converted into a digital value by the signal conversion circuit SC, and it is written into the storage device MM. Then, an anomaly is detected by comparing a value calculated from the gamma expected voltage value data stored in the storage device MM with the measured value, or comparing the set value written in the storage device MM with the measured value. This configuration can reduce an input range for an electric potential difference measurement and allows the signal conversion circuit SC to be constituted of low voltage elements. Furthermore, since the electric potential measurement is performed during a blank period of the display apparatus 10, an effect of having no influence on a normal display operation and an effect of avoiding deterioration of the signal conversion circuit SC by stopping the circuit during a non-measurement period can be obtained.

Thus, this embodiment includes sequentially measuring the electric potential difference between one pair among the output terminals b1 to bN of the output amplifiers of the gamma voltage generating circuit GVD, converting the measured voltage into a digital value through an amplification/signal conversion circuit (signal conversion circuit SC), and performing fault detection by comparing a value stored in the storage device MM and the above-described measured value.

Second Embodiment

Figure 6A:
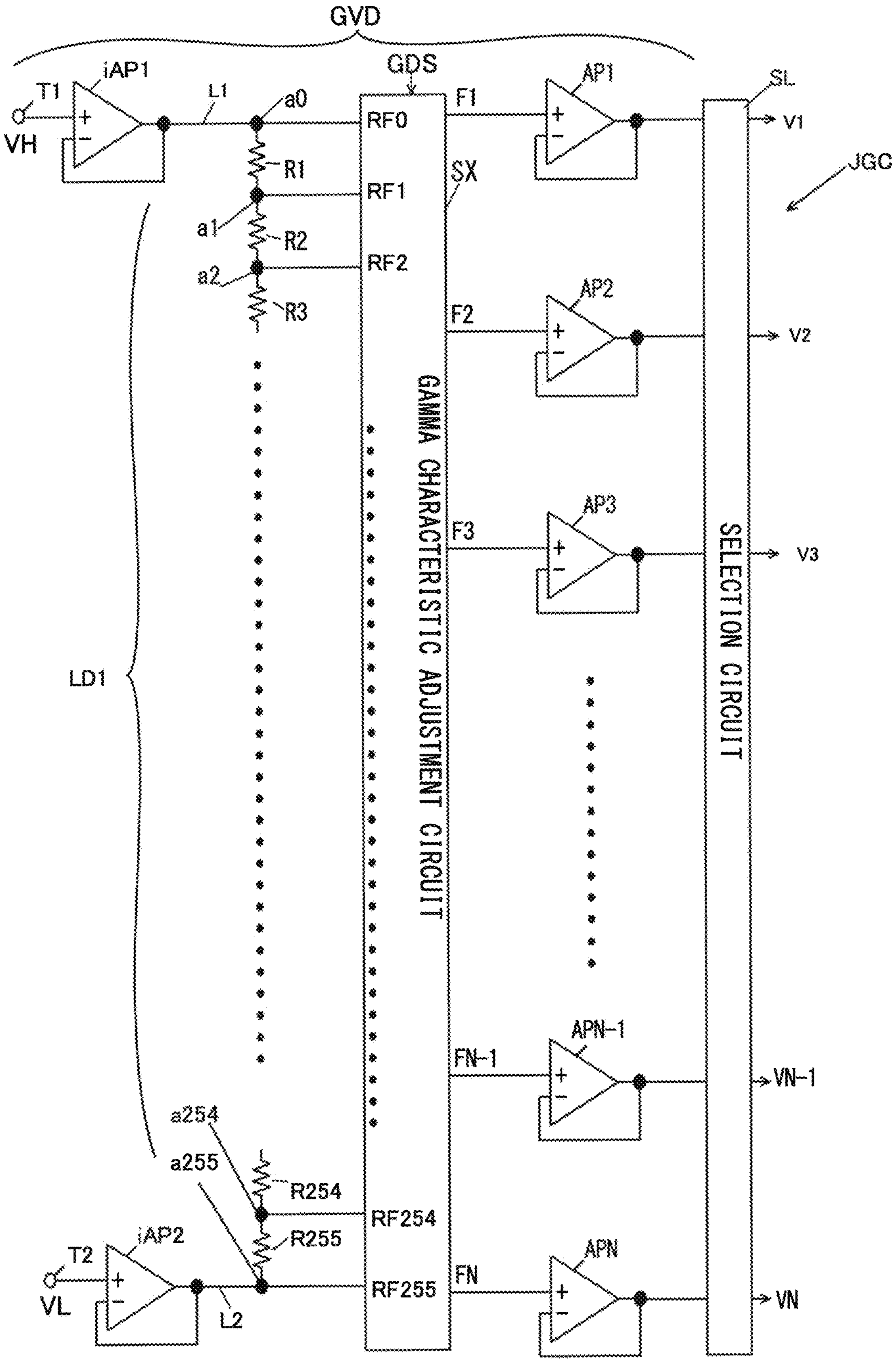
FIGS. 6A and 6B are right and left halves of a block diagram illustrating an example of a circuit configuration of a gradation voltage generating circuit of a second embodiment.
Figure 6B:
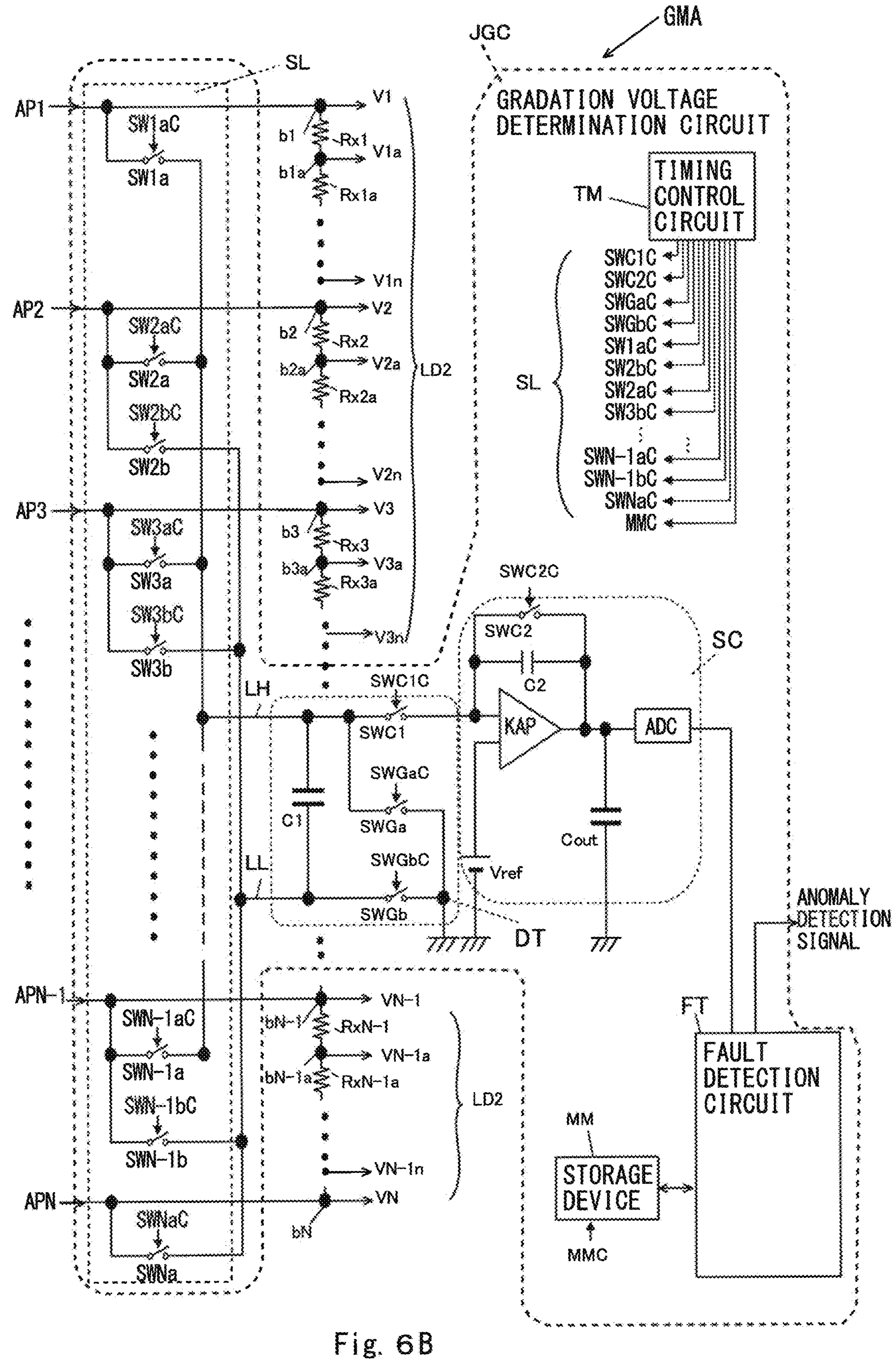

FIGS. 6A and 6B are right and left halves of a block diagram illustrating an example (second embodiment) of a circuit configuration of the gradation voltage generating circuit GMA. The second embodiment is identical to the above-described first embodiment except that the circuit configuration of the gradation voltage generating circuit GMA is configured as illustrated in FIGS. 6A and 6B.

(Gamma Voltage Generating Circuit GVD)

As illustrated in FIGS. 6A and 6B, the gamma voltage generating circuit GVD includes an input amplifier iAP1 and an input amplifier iAP2 as buffer amplifiers for input, a first ladder resistor LD1 (resistor voltage dividing circuit), a gamma characteristic adjustment circuit SX, the second ladder resistor LD2 (resistor voltage dividing circuit), and output amplifiers AP1 to APN as buffer amplifiers for output.

Each of the input amplifier iAP1, the input amplifier iAP2, and the output amplifiers AP1 to APN illustrated in FIG. 6A is a voltage follower operational amplifier with its own inverting input terminal and output terminal connected to one another.

The input amplifier iAP1 receives the high first reference voltage VH, which is received at the terminal T1 of the source driver 120, at its own non-inverting input terminal, outputs an electric potential obtained by amplifying the first reference voltage VH from its own output terminal as a first electric potential, and applies this to a line L1.

The input amplifier iAP2 receives the second reference voltage VL of a low electric potential, which is received at the terminal T2 of the source driver 120, at its own non-inverting input terminal, outputs an electric potential obtained by amplifying the second reference voltage VL from its own output terminal as a second electric potential, and applies this to a line L2.

The first ladder resistor LD1 is a ladder resistor circuit that includes, for example, resistors R1 to R255 connected in series, and ladder taps a1 to a255, which are coupling points between adjacent resistors in these resistors R1 to R255, are connected to the gamma characteristic adjustment circuit SX. One end of the resistor R1 that is one end (ladder tap a1) of the first ladder resistor LD1 is connected to the line L1, and one end of the resistor R255 that is the other end (ladder tap a255) of the first ladder resistor LD1 is connected to the line L2.

With such a configuration, the first ladder resistor LD1 divides the voltage between the lines L1 and L2, outputs 256 voltages having voltage values different from one another from the ladder taps a1 to a255 of the resistors R1 to R255 as reference voltages RF0 to RF255, and supplies each to the gamma characteristic adjustment circuit SX.

The gamma characteristic adjustment circuit SX selects N (a predetermined number) reference voltages having voltage values different from one another according to the gamma curve characteristics set by the gamma setting signal GDS supplied from the display controller 100 from among the reference voltages RF0 to RF255. The gamma curve characteristics differ for each RGB (the red color, green color, and blue color). N is a positive integer of two or more. Then, the gamma characteristic adjustment circuit SX supplies the selected N reference voltages as gamma voltages F1 to FN to non-inverting input terminals of the output amplifiers AP1 to APN, respectively.

The output amplifiers AP1 to APN output electric potentials obtained by individually amplifying the gamma voltages F1 to FN, which are received at the respective non-inverting input terminals, from their own output terminals. Since the output amplifiers AP1 to APN are voltage follower operational amplifiers, the respective output electric potentials from their own output terminals are equal to the gamma voltages F1 to FN.

The second ladder resistor LD2 includes resistors Rx1 to RxN in which N or more resistors including the resistor Rx1 and the resistor RxN are connected in series. The resistor Rx1 is connected to the output terminal of the output amplifier AP1, and the resistor RxN is connected to the output terminal of the output amplifier APN.

The second ladder resistor LD2 divides the voltage between the output terminal of the output amplifier AP1 and the output terminal of the output amplifier APN by the N or more resistors, thereby outputting N voltages having voltage values different from one another from one ends of the respective resistors Rx1 to RxN as the reference gradation voltages V1 to VN (gamma voltages F1 to FN) and N or more reference gradation voltages.

With such a configuration, the second ladder resistor LD2 divides the voltage between adjacent output taps between the output terminal (output tap b1) of the output amplifier AP1 and the output terminal (output tap bN) of the output amplifier APN, outputs the N reference gradation voltages V1 to VN (gamma voltages F1 to FN) having voltage values different from one another and N or more reference gradation voltages from the output taps b1 to bN of the resistors Rx1 to RxN, and supplies each to the gradation voltage conversion unit 122.

That is, the reference gradation voltages V1 to VN (gamma voltages F1 to FN) representing the luminance levels of N gradations according to the desired gamma curve characteristics and N or more reference gradation voltages are output to the gradation voltage conversion unit 122 by the output amplifiers AP1 to APN and the second ladder resistor LD2.

Next, the gradation voltage determination circuit JGC illustrated in FIG. 6B will be described.

(Detection Circuit DT)

The detection circuit DT includes an input line LH that acquires a high electric potential, an input line LL that acquires a low electric potential, a measurement capacitance C1 connected to the input lines LH and LL, changeover switches SWGa and SWGb, and an open/close switch SWC1 of the input line LH. The changeover switches SWGa and SWGb discharge and charge the measurement capacitance C1 in response to control signals SWGaC and SWGbC from the timing control circuit TM. The open/close switch SWC1 starts up the detection circuit DT in response to a control signal SWC1C from the timing control circuit TM. The input line LH is connected to the signal conversion circuit SC.

The measurement capacitance C1 is discharged when the changeover switches SWGa and SWGb are turned on and enters a state capable of being charged when the changeover switches SWGa and SWGb are turned off. The detection circuit DT enters a start-up state when the open/close switch SWC1 is turned on and supplies an electric potential to the signal conversion circuit SC.

(Signal Conversion Circuit SC)

The signal conversion circuit SC includes a measurement amplifier KAP having an input side to which the input line LH and a reference power supply Vref are connected, an open/close switch SWC2, a capacitance C2 for removing high-frequency noise, a ground capacitance Cout for reducing an output voltage fluctuation on an output side, and an A/D conversion circuit ADC after the ground capacitance Cout. Both the open/close switch SWC2 and the capacitance C2 are connected in parallel to input and output sides of the measurement amplifier KAP. The signal conversion circuit SC is in a stopped state when the open/close switch SWC2 is turned on in response to a control signal SWC2C from the timing control circuit TM and activates the A/D conversion circuit ADC in an OFF state of the open/close switch SWC2 to supply an output value (measured value) to the fault detection circuit FT.

(Fault Detection Circuit FT)

The fault detection circuit FT is connected to the A/D conversion circuit ADC and the storage device MM and detects a fault and anomaly in the gamma voltage generating circuit GVD by comparing comparison original data held in the storage device MM with the output value (measured value) of the A/D conversion circuit ADC.

(Selection Circuit SL and Timing Control Circuit TM)

The selection circuit SL includes a group of the switches SWC1, SWGa, and SWGb of the detection circuit DT, the switch SWC2 of the signal conversion circuit SC, and a group of selection switches SW1*a*, SW2*b*, SW2*a*, Sw3*b*, . . . , SWN-1*a*, SWN-1*b*, and SWNa for sequentially measuring the electric potential difference between one pair among the output terminals b1 to bN of the output amplifiers AP1 to APN of the gamma voltage generating circuit GVD.

The selection switch SW1*a* is connected to the input line LH that acquires a high electric potential of the detection circuit DT, and the selection switch SWNa is connected to the input line LL that acquires a low electric potential of the detection circuit DT. A group of the selection switches SW2C to SWN-1*b* are connected to the input lines LH and LL. The group of selection switches SW1*a*, SW2*b*, SW2*a*, Sw3*b*, . . . , SWN-1*a*, SWN-1*b*, and SWNa outputs a high electric potential and a low electric potential from one pair of the output terminals b1 to bN selected from among the group of selection switches SW1*a*, SW2*b*, SW2*a*, Sw3*b*, . . . , SWN-1*a*, SWN-1*b*, and SWNa in response to control signals SW1*a*C, SW2*b*C, SW2*a*C, SW3*b*c, . . . . C, SWN-1*a*C, SWN-1*b*C, and SWNaC supplied from the timing control circuit TM to the input lines LH and LL of the detection circuit DT, and supplies the high electric potential and the low electric potential to the detection circuit DT.

The timing control circuit TM is a microcomputer (not illustrated) and controls a group of the switches SWC1, SWC2, SWGa, SWGb, SW1*a*, SW2*b*, SW2*a*, SW3*b*, . . . , SWN-1*a*, SWN-1*b*, and SWNa of the selection circuit SL by control signals SWC1C, SWC2C, SWGaC, SWGbC, SW1*a*C, SW2*b*C, SW2*a*C, SW3*b*C, . . . , SWN-1*a*C, SWN-1*b*C, and SWNaC supplied to the group of the switches SWC1, SWC2, SWGa, SWGb, SW1*a*, SW2*b*, SW2*a*, SW3*b*, . . . , SWN-1*a*, SWN-1*b*, and SWNa through respective predetermined lines (not illustrated).

Figure 7:
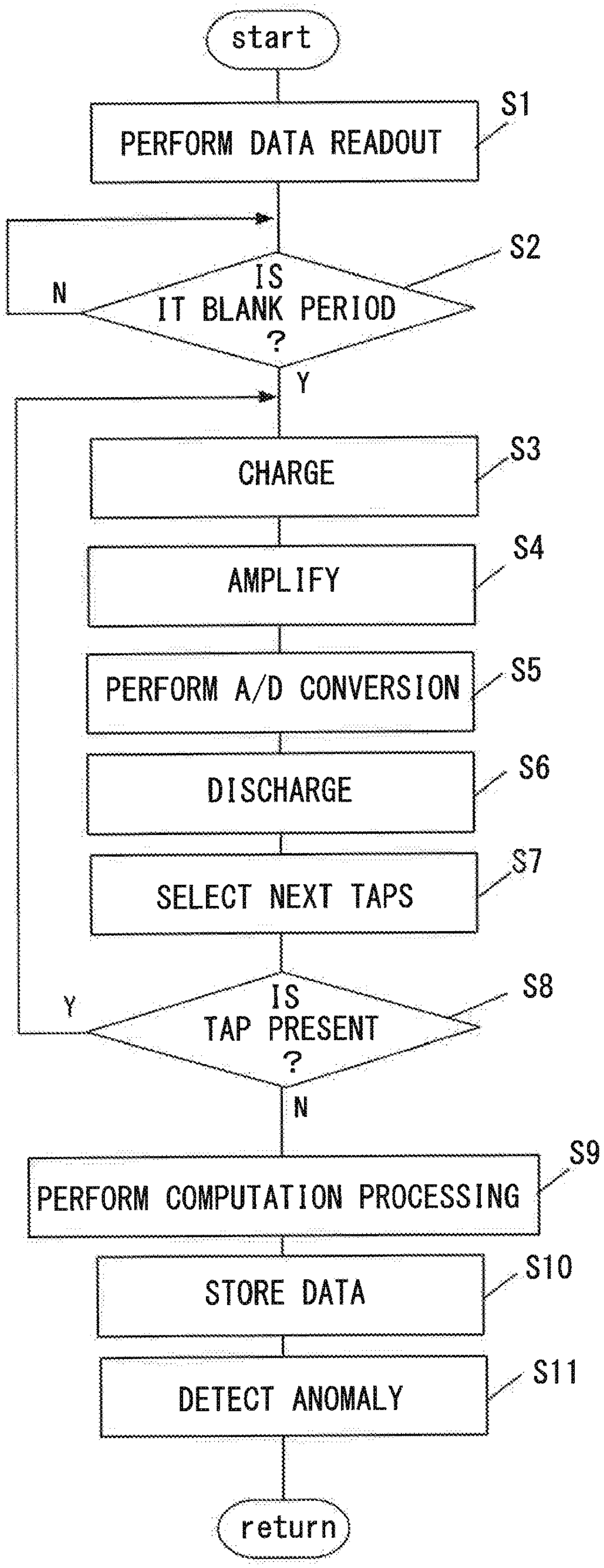
FIG. 7 is a flowchart of a gradation voltage determination operation by the gradation voltage generating circuit of the second embodiment.
Figure 8:
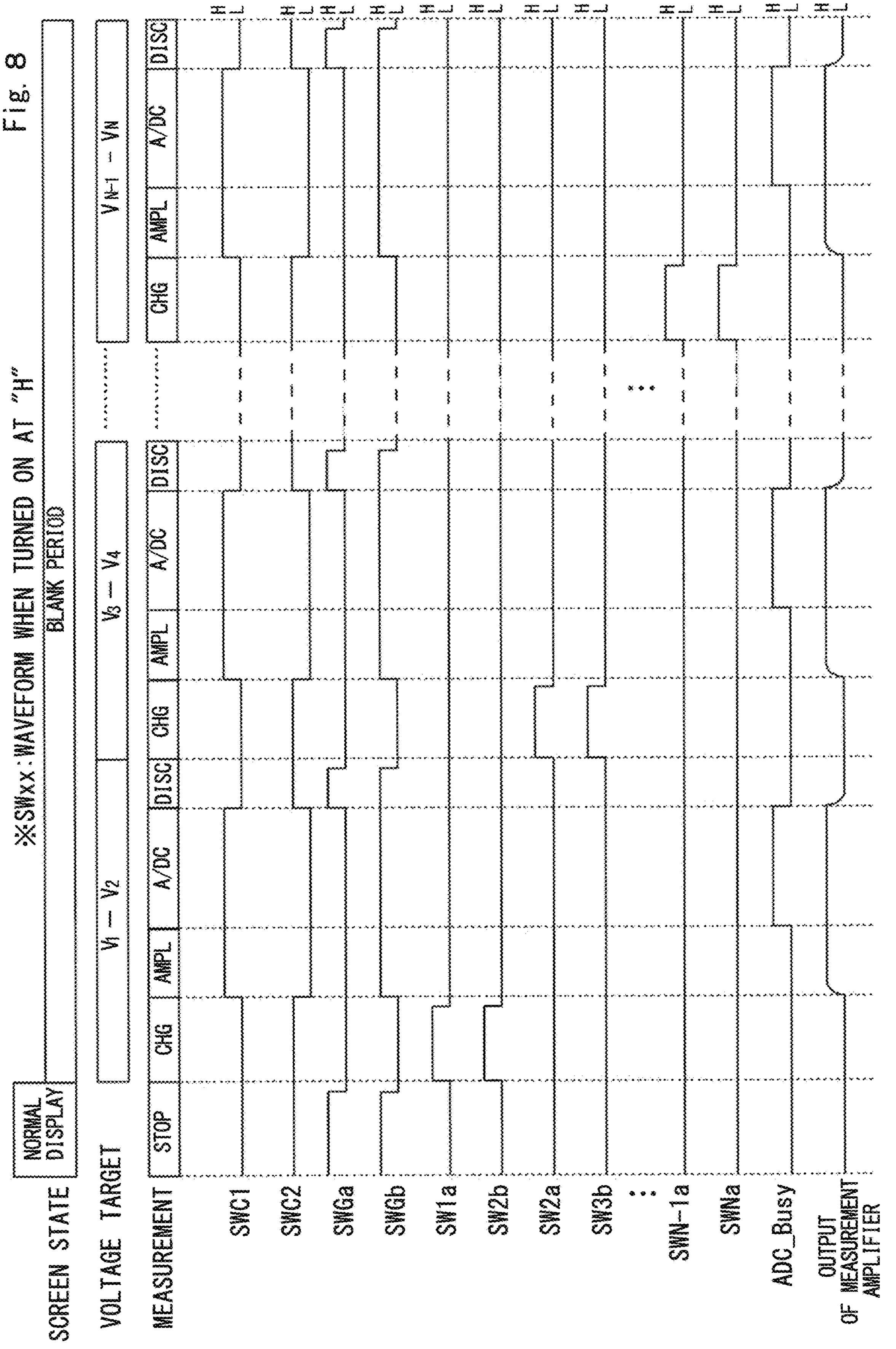
FIG. 8 is a timing chart representing switching timing related to the gradation voltage determination operation by the gradation voltage generating circuit of the second embodiment.

Next, a gradation voltage determination operation by the gradation voltage determination circuit JGC of this embodiment, especially the selection circuit SL and the timing control circuit TM, will be described in detail based on FIG. 7 and FIG. 8. FIG. 7 is a flowchart of the gradation voltage determination operation, and FIG. 8 is a timing chart representing switching timing related to the gradation voltage determination operation.

As illustrated in FIG. 7, the timing control circuit TM performs data readout of the comparison original data, which has been periodically read and held, from the storage device MM by means of a control signal MMC during a normal operation (Step S1).

The timing control circuit TM determines whether or not it is a blank period in order to stop a measurement operation during a normal display and waits for the blank period of the video signal to be reached (Step S2: N). As illustrated in FIG. 8, the timing control circuit TM turns on the switch SWC2 of the signal conversion circuit SC, puts the switches SWGa and SWGb also into an ON state to be grounded, turns off the other switches to stop the detection circuit DT and the subsequent circuits, and stops the measurement operation by the gradation voltage determination circuit JGC during the normal display.

Then, when the timing control circuit TM detects the blank period of the video signal (Step S2: Y), the measurement of the gradation voltage determination circuit JGC is performed during the blank period.

The timing control circuit TM keeps the switch SWC2 of the signal conversion circuit SC on and turns on one pair of the selection switches SW1*a* and SW2*b* that select the output taps b1 and b2 of the output amplifiers AP1 and AP2 where the electric potentials are first measured to charge the measurement capacitance C1 of the detection circuit DT (Step S3) (see CHG in FIG. 8).

Next, the timing control circuit TM turns off a group of the selection switches SW1*a* and SW2*a*, then turns on the group of the switches SWC1, SWGa, and SWGb of the detection circuit DT, and puts the switch SWC2 of the signal conversion circuit SC into the OFF state to activate the A/D conversion circuit ADC, couple the measurement capacitance C1 to the measurement amplifier KAP, and amplify an electric charge (voltage) charged in the measurement capacitance C1 with the measurement amplifier KAP (Step S4) (see AMPL in FIG. 8).

Next, the timing control circuit TM maintains the states of the group of the switches SWC1, SWGa, and SWGb of the detection circuit DT and the switch SWC2 of the signal conversion circuit SC to perform A/D conversion of the output voltage of the measurement amplifier KAP with the activated A/D conversion circuit ADC (Step S5) (see A/DC in FIG. 8).

Next, the timing control circuit TM turns off the switch SWC1 of the detection circuit DT, turns on the switch SWC2 of the signal conversion circuit SC, grounds the switches SWGa and SWGb also in the ON state to discharge electric charges charged in the measurement capacitance C1 and the measurement amplifier capacitance C2 (Step S6) (see DISC in FIG. 8). This stops the detection circuit DT and the subsequent circuits.

Next, the timing control circuit TM selects next taps (Step S7), and when a next output tap is present (Step S8: Y), the timing control circuit TM returns to Step S2 to perform the measurement of the gradation voltage determination circuit JGC. Here, when it is during the blank period, the timing control circuit TM keeps the switch SWC2 of the signal conversion circuit SC on and turns on one pair of the selection switches SW2*a* and SW3*b* that select the output taps b2 and b3 of the output amplifiers AP2 and AP3 where the next electric potentials are measured to charge the measurement capacitance C1 of the detection circuit DT (Step S3).

Thereafter, the timing control circuit TM performs the electric potential measurement sequentially one pair at a time until the electric potential measurements for all pairs of the output taps are completed. However, when no last output tap to be measured is present (Step S8: N), the timing control circuit TM performs computation processing and generates the comparison original data for anomaly detection from past data measurement results (Step S9).

Next, the timing control circuit TM stores the measured data and the comparison original data in the storage device MM (Step S10).

Next, when the measured data (measured value) of this time has an anomaly compared to the previous comparison original data, the timing control circuit TM outputs an anomaly detection signal (Step S11).

With this embodiment illustrated in FIG. 6B, the detection circuit DT is constituted of the measurement capacitance C1 and the predetermined switches SWC1, SWGa, and SWGb, and the electric potential difference between one pair among the output terminals b1 to bN (gamma voltages F1 to FN) of the output amplifiers AP1 to APN of the gamma voltage generating circuit GVD can be charged to the measurement capacitance C1 by a switch operation. The electric potential difference of the measurement capacitance C1 of the detection circuit DT is shifted to a GND level reference, and the measurement result can be written into the storage device MM via the measurement amplifier KAP and the A/D conversion circuit ADC of the signal conversion circuit SC. In addition, in a manner to share one capacitance element of the measurement capacitance C1 of the detection circuit DT for electric potential measurement scanning of a pair of taps of the output terminals b1 to bN, the electric potential difference between one pair among the output terminals b1 to bN can be efficiently measured by time-division operation.

Third Embodiment

Figure 9A:
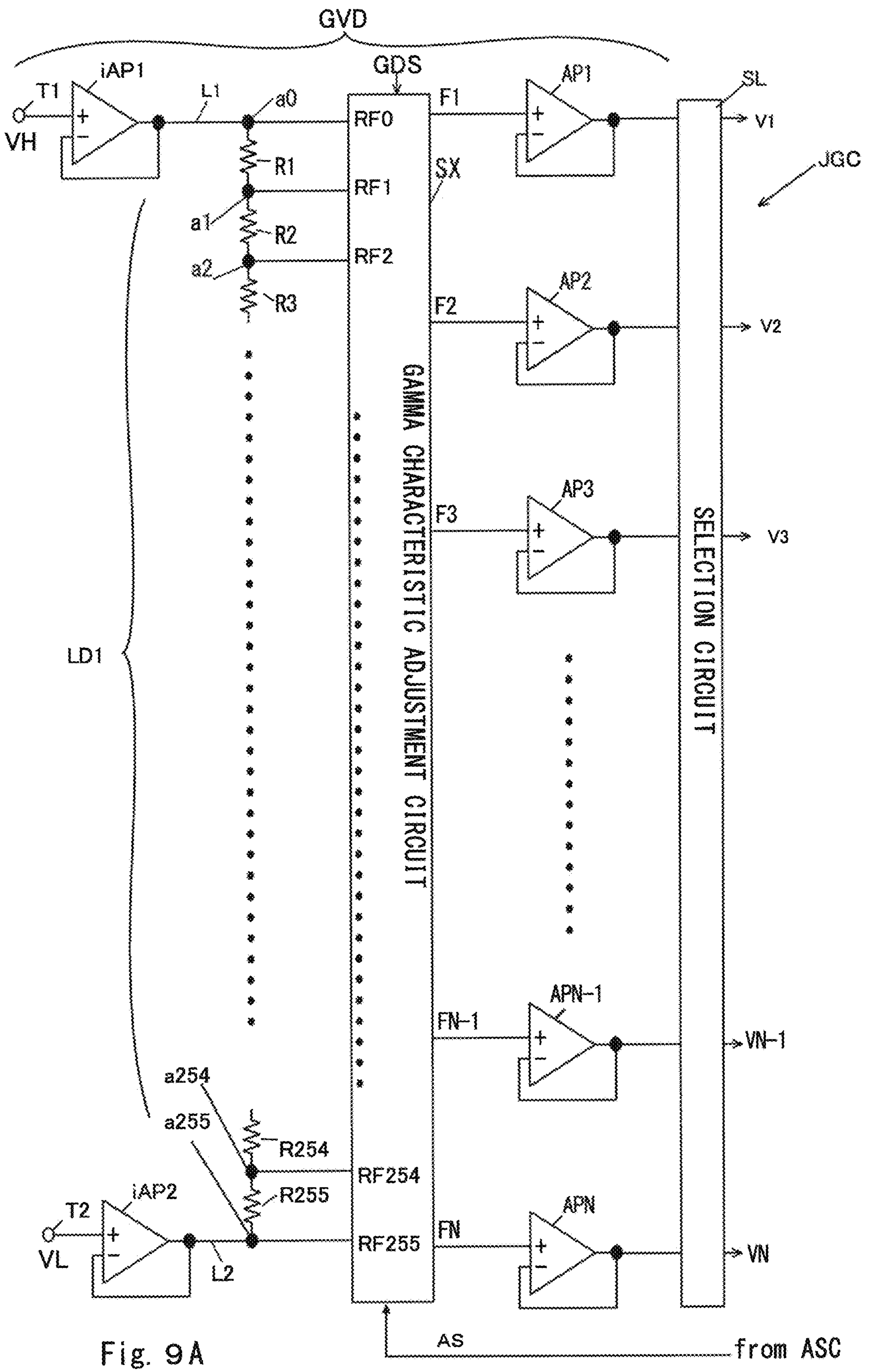
FIGS. 9A and 9B are right and left halves of a block diagram illustrating a circuit configuration of a gradation voltage generating circuit of a third embodiment.
Figure 9B:
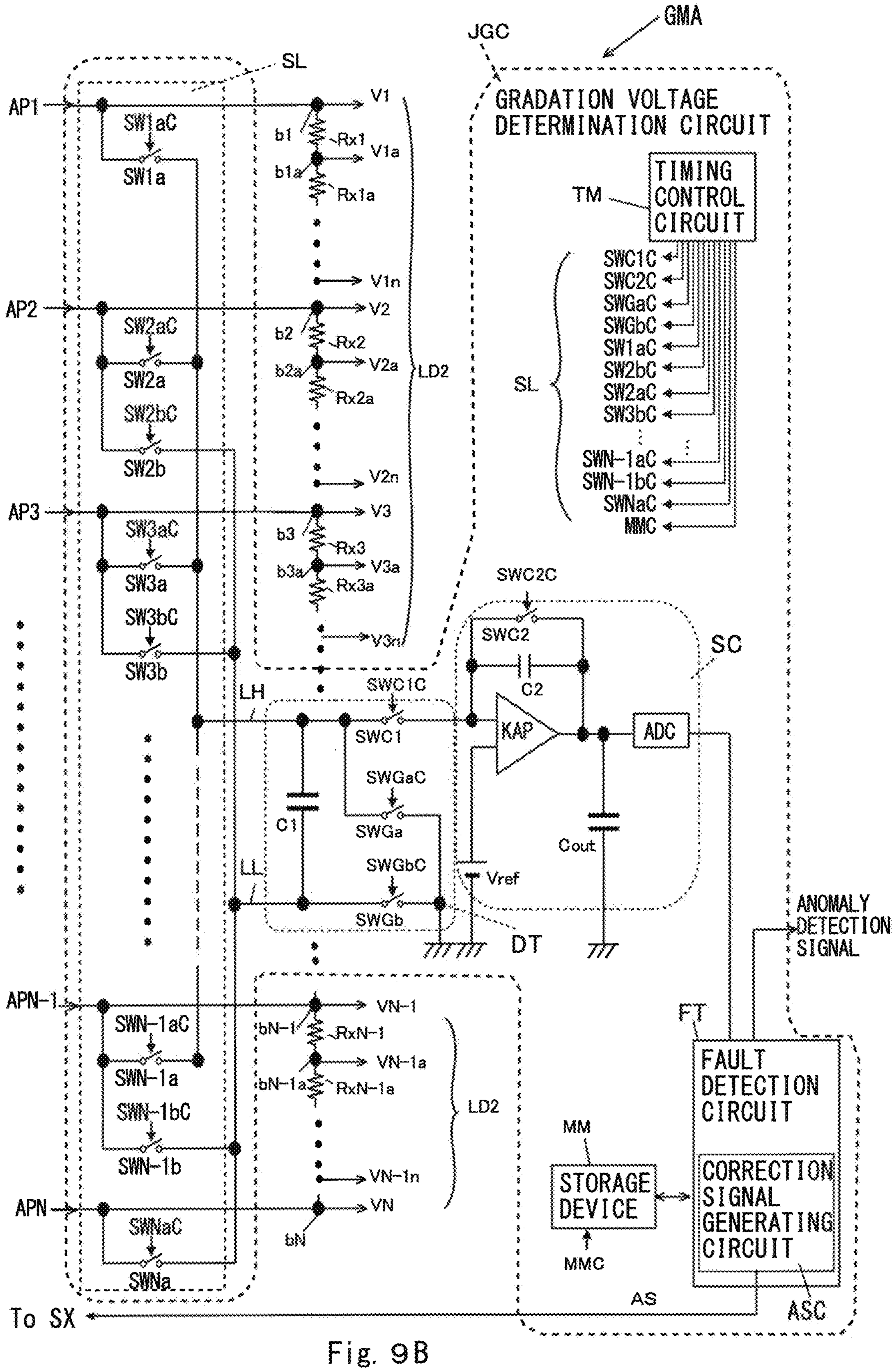

FIGS. 9A and 9B are right and left halves of a block diagram illustrating a circuit configuration of the gradation voltage generating circuit GMA of a third embodiment. This embodiment is identical to the above-described second embodiment except for the circuit configuration of the gradation voltage generating circuit GMA, especially that a correction signal generating circuit ASC is disposed in the fault detection circuit FT (see FIG. 9B). Therefore, only the difference from the second embodiment (the correction signal generating circuit ASC) will be described.

The correction signal generating circuit ASC in the fault detection circuit FT computes a difference between actual measurement data of each electric potential difference group between the output terminals b1 to bN (reference gradation voltages V1 to VN) of the output amplifiers AP1 to APN of the gamma voltage generating circuit GVD and the gamma expected voltage value data stored in the storage device MM, and calculates a correction amount of a selector setting in the gamma characteristic adjustment circuit SX that adjusts the gamma curve characteristics. Then, the correction signal generating circuit ASC generates a correction signal AS based on the correction amount and supplies the correction signal AS to the gamma characteristic adjustment circuit SX (see FIG. 9A) to correct the set value.

Since the fault detection circuit FT includes the correction signal generating circuit ASC that generates the correction signal AS based on the difference between the expected voltage value and the measured value and supplies the correction signal AS to the gamma characteristic adjustment circuit SX, the output voltage of the gamma voltage generating circuit GVD can be corrected by comparing the actual measurement data with the gamma expected voltage value data.

The gamma expected voltage value data, which is gamma curve setting data of the gamma characteristic adjustment circuit SX, is periodically read from a non-volatile memory, such as the storage device MM. A plurality of sets are included in the gamma expected voltage value data, making it possible to respond to applications that switch the sets according to conditions, such as temperature.

Fourth Embodiment

Figure 10:
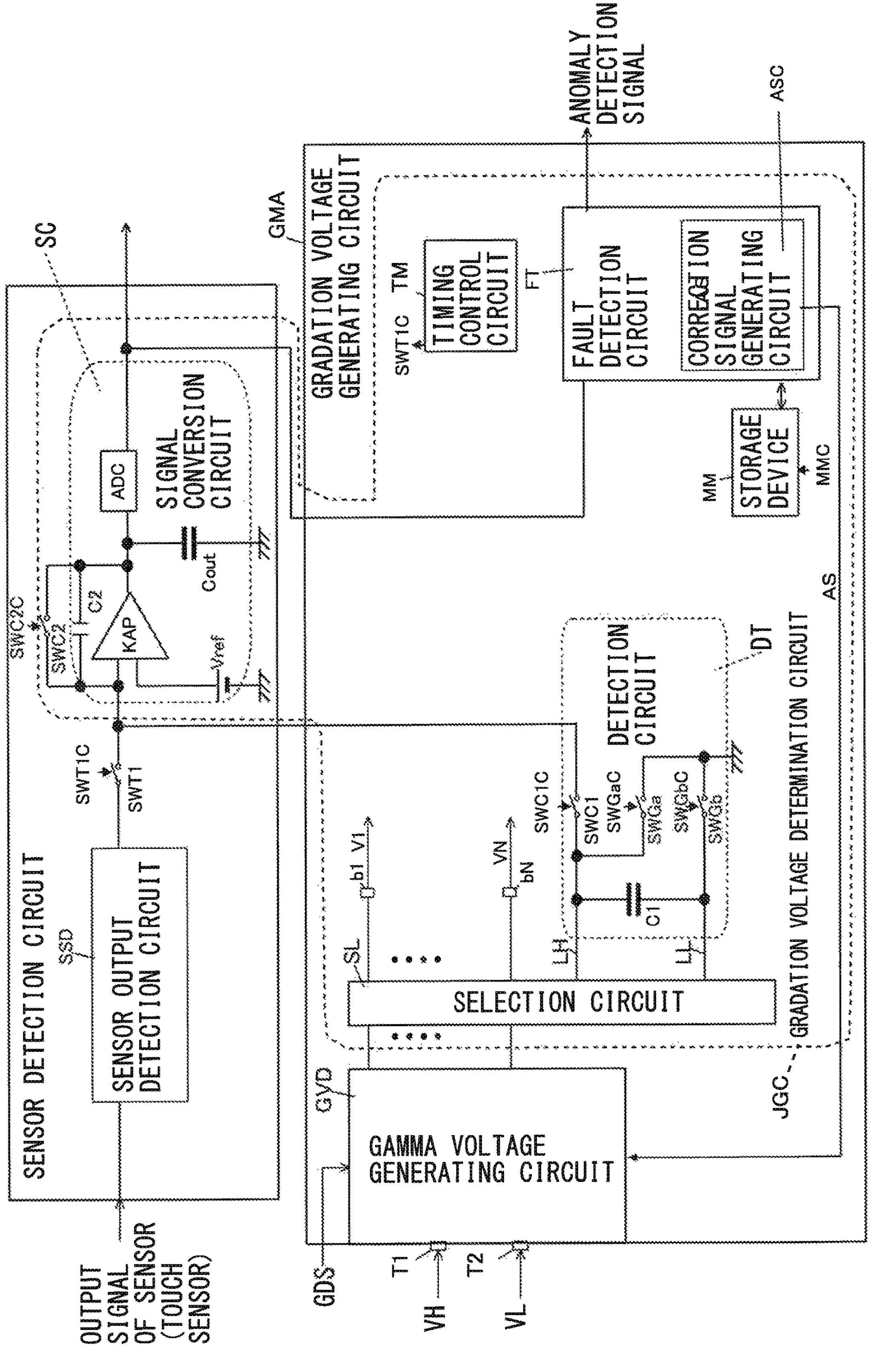
FIG. 10 is a schematic block diagram illustrating a circuit configuration of a gradation voltage generating circuit in a source driver of a fourth embodiment, in which wiring of a gamma voltage generating circuit, a timing control circuit, and a selection circuit is omitted.

FIG. 10 is a schematic block diagram illustrating a circuit configuration of the gradation voltage generating circuit GMA in the source driver 120 of a fourth embodiment (wiring of the gamma voltage generating circuit GVD, the timing control circuit TM, and the selection circuit SL is omitted). This embodiment is identical to the above-described second or third embodiment except that the source driver 120 includes switches SWT1 and SWC1 of a switching control circuit for switching to share the signal conversion circuit SC of the gradation voltage generating circuit GMA with a sensor output detection circuit SSD, and the switching control circuit performs time-division switching control during the blank period in a video signal. The sensor output detection circuit SSD can share the signal conversion circuit SC by selectively switching between the switches SWT1 and SWC1 (switching control circuit) in a time division manner in products having the sensor output detection circuit SSD of a sensor detection circuit that receives output signals of sensors, such as touch sensors.

What is claimed is:

1. A display apparatus comprising:

a display device having a plurality of display cells; and a source driver that supplies gradation voltages corresponding to respective luminance levels for the display cells indicated by a video signal, wherein the source driver includes:

a gamma voltage generating circuit including a resistor voltage dividing circuit that includes a plurality of output terminals, the plurality of output terminals outputting respective reference voltages divided according to gamma curve characteristics for generating the gradation voltages; and a gradation voltage determination circuit that measures an electric potential difference between one pair among the plurality of output terminals and determines whether or not the electric potential difference corresponds to a reference voltage group based on the gamma curve characteristics, wherein the gradation voltage determination circuit includes:

a timing control circuit that generates a timing signal to control a measurement of the electric potential difference between the one pair among the plurality of output terminals during a blank period in the video signal;

a selection circuit that selects the one pair from among the plurality of output terminals of the resistor voltage dividing circuit based on the timing signal;

a detection circuit that detects the electric potential difference between the selected one pair among the plurality of output terminals;

a signal conversion circuit that performs analog-to-digital (A/D) conversion of the detected electric potential difference to generate a measured value; and a fault detection circuit that detects a fault in the gamma voltage generating circuit based on the measured value.

2. The display apparatus according to claim 1, further comprising a storage device that stores an expected voltage value of the gamma curve characteristics, wherein the fault detection circuit detects a fault in the gamma voltage generating circuit by comparing the expected voltage value with the measured value.

3. The display apparatus according to claim 2, wherein the resistor voltage dividing circuit includes a gamma characteristic adjustment circuit that adjusts the gamma curve characteristics, and the fault detection circuit includes a correction signal generating circuit that generates a correction signal based on a difference between the expected voltage value and the measured value and supplies the correction signal to the gamma characteristic adjustment circuit.

4. The display apparatus according to claim 3, further comprising:

a sensor output detection circuit; and a switching control circuit for switching to share the signal conversion circuit of the gradation voltage determination circuit with the sensor output detection circuit, wherein the switching control circuit performs time-division switching control during the blank period in the video signal.

5. A source driver for supplying a display device having a plurality of display cells with gradation voltages corresponding to respective luminance levels for the display cells indicated by a video signal, the source driver comprising:

a gamma voltage generating circuit including a resistor voltage dividing circuit with a plurality of output terminals, the plurality of output terminals outputting respective reference voltages divided according to gamma curve characteristics for generating the gradation voltages; and a gradation voltage determination circuit that measures an electric potential difference between one pair among the plurality of output terminals and determines whether or not the electric potential difference corresponds to a reference voltage group based on the gamma curve characteristics, wherein the gradation voltage determination circuit includes:

a timing control circuit that generates a timing signal to control a measurement of the electric potential difference between the one pair among the plurality of output terminals during a blank period in the video signal;

a selection circuit that selects the one pair from among the plurality of output terminals of the resistor voltage dividing circuit based on the timing signal;

a detection circuit that detects the electric potential difference between the selected one pair among the plurality of output terminals;

a signal conversion circuit that performs A/D analog-to-digital (A/D) conversion of the detected electric potential difference to generate a measured value; and a fault detection circuit that detects a fault in the gamma voltage generating circuit based on the measured value.

6. The source driver according to claim 5, further comprising a storage device that stores an expected voltage value of the gamma curve characteristics, wherein the fault detection circuit detects a fault in the gamma voltage generating circuit by comparing the expected voltage value with the measured value.

7. The source driver according to claim 6, wherein the resistor voltage dividing circuit includes a gamma characteristic adjustment circuit that adjusts the gamma curve characteristics, and the fault detection circuit includes a correction signal generating circuit that generates a correction signal based on a difference between the expected voltage value and the measured value, and supplies the correction signal to the gamma characteristic adjustment circuit.

8. The source driver according to claim 7, further comprising:

a sensor output detection circuit; and a switching control circuit for switching to share the signal conversion circuit of the gradation voltage determination circuit with the sensor output detection circuit, wherein the switching control circuit performs time-division switching control during the blank period in the video signal.

9. A gradation voltage generating circuit for generating a plurality of gradation voltages corresponding to respective luminance levels for display cells indicated by a video signal, the gradation voltage generating circuit comprising:

a gamma voltage generating circuit including a resistor voltage dividing circuit that includes a plurality of output terminals, the plurality of output terminals outputting respective reference voltages divided according to gamma curve characteristics for generating the gradation voltages; and a gradation voltage determination circuit that measures an electric potential difference between one pair among the plurality of output terminals and determines whether or not the electric potential difference corresponds to a reference voltage group based on the gamma curve characteristics, wherein the gradation voltage determination circuit includes:

a timing control circuit that generates a timing signal to control a measurement of the electric potential difference between the one pair among the plurality of output terminals during a blank period in the video signal;

a selection circuit that selects the one pair from among the plurality of output terminals of the resistor voltage dividing circuit based on the timing signal;

a detection circuit that detects the electric potential difference between the selected one pair among the plurality of output terminals;

a signal conversion circuit that performs analog-to-digital (A/D) conversion of the detected electric potential difference to generate a measured value; and a fault detection circuit that detects a fault in the gamma voltage generating circuit based on the measured value.

10. The gradation voltage generating circuit according to claim 9, further comprising a storage device that stores an expected voltage value of the gamma curve characteristics, wherein the fault detection circuit detects a fault in the gamma voltage generating circuit by comparing the expected voltage value with the measured value.

11. The gradation voltage generating circuit according to claim 10, wherein the resistor voltage dividing circuit includes a gamma characteristic adjustment circuit that adjusts the gamma curve characteristics, and the fault detection circuit includes a correction signal generating circuit that generates a correction signal based on a difference between the expected voltage value and the measured value and supplies the correction signal to the gamma characteristic adjustment circuit.

* * * * *